United States Patent [19]
Hampton

[11] Patent Number: 5,128,701
[45] Date of Patent: Jul. 7, 1992

[54] COMPACT, RETRACTABLE, AND SELF-HOUSED SHOULDER STABILIZER FOR SMALL VIDEO CAMERAS

[76] Inventor: Loren D. Hampton, 4831 N. 5 Mile Rd., Boise, Id. 83704

[21] Appl. No.: 723,822

[22] Filed: Jul. 1, 1991

[51] Int. Cl.⁵ ............................................. G03B 29/00
[52] U.S. Cl. .................................................. 354/82
[58] Field of Search ........................ 354/82, 293, 81

[56] References Cited

U.S. PATENT DOCUMENTS

| | | | |
|---|---|---|---|
| D. 270,734 | 9/1983 | Emerson | D16/44 |
| D. 276,620 | 12/1984 | Hanke | D16/44 |
| D. 290,709 | 7/1987 | Hedrick | D16/44 |
| D. 302,171 | 7/1989 | Assel et al. | D16/243 |
| D. 302,561 | 8/1989 | Goins | D16/242 |
| D. 309,907 | 8/1990 | Herb | D16/242 |
| 4,327,986 | 5/1982 | Carter | 354/293 |
| 4,437,753 | 3/1984 | Dunn | 354/293 |
| 4,542,966 | 9/1985 | Knaudt | 354/82 |
| 4,545,660 | 10/1985 | Rudolf | 354/82 |
| 4,687,309 | 8/1987 | Breslau | 354/82 |
| 4,727,390 | 2/1988 | Brown | 354/82 |
| 4,943,820 | 7/1990 | Larock | 354/82 |
| 4,963,904 | 10/1990 | Lee | 354/82 |

OTHER PUBLICATIONS

Ads from Video Magazine, Apr., 1991 pp. 91, 97, 108.

*Primary Examiner*—Michael L. Gellner
*Attorney, Agent, or Firm*—5

[57] ABSTRACT

A small and compact operator held shoulder support to stabilize small video cameras.

The major elements of this invention are: a camera mounting body which attaches to, and fits directly beneath, a camcorder, and a shoulder support member designed to retract within the mounting body for maximum compactness. The stabilizer includes a self-executing retentive mechanism utilizing a leaf spring and a cam which automatically and securely holds the support arm in either the extended or retracted position. This self-acting retentive feature relieves the operator from fumbling with locking screws or other devices common in other collapsible stabilizers. The camera mounting body includes finger grips on each side to facilitate the use of the operator's second hand to further steady the camera. Further, the stabilizer includes an adjustment screw to raise or lower the elevation of the extended shoulder support for better eye-to-eyepiece alignment.

With the support arm retracted, the entire stabilizer merely adds approximately one inch to the height of the camera, thus making it very compatible with the new breed of small compact camcorders. The entire assembly possesses a neat and uniform appearance. It can remain mounted on a camcorder even while carried in a small protective camera bag.

12 Claims, 5 Drawing Sheets

COMPACT, RETRACTABLE, AND SELF-HOUSED SHOULDER STABILIZER FOR SMALL VIDEO CAMERAS

BACKGROUND

1. FIELD OF INVENTION

This invention relates to an operator held support for cameras, more specifically, to a shoulder-hand support for small video cameras.

2. DESCRIPTION OF PRIOR ART

The design trend of hand cameras is toward smaller, lightweight models. During the past decade designers have made great progress toward reducing the size and weight of cameras. The success in size reduction is especially noticeable in the field of video camcorders. Currently, many models of the new camcorders can be held in the palm of the hand. This small size, being convenient and easy to carry has captured a large share of the video camera market, especially among amateurs. However, they are noted for one widely recognized problem. It is difficult to hold the small camcorders steady during use. Therefore they produce images which appear shaky and annoying when viewed on television. Most small models are designed to be held by one hand in front of, and slightly to the side of the users face on a line in front of the right shoulder. The hand is supported only by the user's vertical forearm. This method of operation results in a nervous, high frequency movement of the hand and camera, which produces the shaky images.

In the past, inventors have created a number of devices designed to steady or stabilize cameras during hand held use. Most were designed for still cameras which are normally held in front of the users face, thus many do not provide proper eye to eyepiece alignment when used with video cameras and held in front of the shoulder. Also, most are relatively large, complex and require significant manipulation because of numerous adjustments and associated locking devices. They are at least several magnitudes of size larger than the current compact video cameras and are therefore incompatible.

In essence, the design of these stabilizers may be adequate for many camera styles, but they are unsatisfactory for today's "Miracles you can put in your pocket". Small video camera designs have simply out paced available stabilizers. It is inconsistent to expect a user to purchase a pocket sized video camera primarily because of its handy, small size, then be content with a stabilizing device two to five times that size, and one which requires considerable manipulation.

Previously patented camera supports include U.S. Pat. Nos. 4,327,986 to Carter (1982), 4,687,309 to Breslau (1987), and 4,943,820 to Larock (1990). These are body mounted or harnessed with straps. They are large, bulky, inconvenient and cumbersome to prepare for use; or if worn continuously for ready use, are uncomfortable; do not possess a neat and uniform appearance, and leave the camera unprotected, thus, subject to damage.

U.S. Pat. Nos. 4,437,753 to Dunn (1984), 4,727,390 to Brown (1988), 4,963,904 to Lee (1990), and U.S. Pat. No. Des. 302,561 to Goins (1989) are relatively complex, unhandy supporting devices which include a number of arms and locking knobs requiring significant manipulation to use and are expensive to manufacture.

U.S. Pat. No. 4,542,966 to Knaudt (1985) is very complex, with numerous parts and locking mechanisms making it expensive to manufacture. It is designed specifically for a still camera, and it incorporates a built-in camera shutter release and film wind mechanism. It is unsuitable for a video camera.

U.S. Pat. No. 4,545,660 to Rudolf (1985) incorporates a bipod support which centers on the user's chest, thus making eye-to-eyepiece alignment difficult for use with most compact camcorders which are designed to be held on a line in front of the right shoulder and forward of the face. Also, it requires manually manipulating a locking screw to secure the supporting member in any position.

U.S. Pat. Nos. Des. 270,734 to Emerson (1983), U.S. Pat. No. Des. 290,709 to Hedrick (1987), U.S. Pat. No. Des. 302,171 to Assel and West (1989), and U.S. Pat. No. Des. 309,907 to Herb (1990) are straight, non-collapsing styles, therefore bulky and difficult to carry, and none provide a means to adjust the shoulder support elevation, whereby the user can better align his eye with the camera viewfinder.

U.S. Pat. No. Des. 276,620 to Hanke (1984) is only partly collapsible, therefore relatively large for current camcorders. Its size does not allow attachment to a camera while carried in a small protective bag; therefore, the camera is exposed to damage. It does not provide a shoulder support elevation adjustment for comfortable eye-to-eyepiece alignment.

In summary, most prior art is for still cameras and therefore designed to be held in front of the users face, rather than to the side, or it is large, bulky and cumbersome, and requires considerable manipulation. None provide a satisfactory combination of small, compact, convenient, handy, and low cost features suitable for use with the current compact video cameras. None yield a stabilizer which requires minimum manipulation, and which possesses the neat and uniform appearance necessary to be compatible with the new breed of camcorders.

OBJECTS AND ADVANTAGES

Conversely, the invention described herein includes a number of advantageous features including small, compact size, simple design, and automatically retained shoulder support which requires little manipulation. These features when combined yield a highly mobile and convenient camera stabilizer which is compatible with the new compact video cameras. It is small enough to enable the user to conveniently carry a camera with its attached stabilizer safely in a small camera bag. Then, at a moments notice, quickly remove the camera, and with a flip of the wrist, extend the shoulder support member for instant and steady use. The operator can even incorporate the use of both hands for maximum stability.

Specifically the objects and advantages of this invention are:

(a) To provide a video camera shoulder support stabilizer which is small, compact and easy to carry rather than cumbersome and bulky. Compactness is achieved by folding and stowing the support member within the camera mounting body;

(b) to provide a video camera stabilizer which is simple and includes automatic features; therefore, it can be quickly prepared for use because it requires little manipulation, instead of one difficult and slow to use, requiring significant manipulation of folding supports with many locking screws and knobs;

(c) to provide a video camera stabilizer which is convenient, comfortable and handy to use for the reduction of shaky images;

(d) to provide a video camera stabilizer which includes facilities to enable the operator to use both hands for greater stability;

(e) to provide a video camera stabilizer which is small and possesses a neat and uniform appearance, making it compatible with the new breed of compact video camcorders;

(f) to provide a video camera stabilizer which even with its many features is still small enough to remain attached to a camera while carried in a small protective bag;

(g) to provide a video camera stabilizer which can be manufactured inexpensively.

Further objects and advantages of this invention will become apparent from consideration of the drawings and ensuing description.

SUMMARY OF INVENTION

The purpose of this invention is to provide a shoulder based camera stabilizer which will noticeably reduce the high frequency, annoying and shaky images produced when operating a small hand held video camera or camcorder. To be compatible with this new breed of hand sized cameras, a stabilizer must be small, compact, lightweight, convenient to carry and quickly prepared for use, thus requiring little manipulation.

These objects are accomplished in the preferred embodiment of this invention by a camera mounting body which attaches to and fits directly beneath a camcorder and a shoulder support member designed to retract within the mounting body for maximum compactness. The stabilizer includes a self-executing retentive mechanism utilizing a leaf spring and a cam which automatically and securely holds the support arm in either the extended or retracted position. This self-acting retentive feature relieves the operator from fumbling with locking screws or other devices common in other collapsible stabilizers. The camera mounting body includes finger grips on each side to facilitate the use of the operator's second hand to further steady the camera. Further, the stabilizer includes an adjustment screw to raise or lower the elevation of the extended shoulder support for better eye-to-eyepiece alignment.

With the support arm retracted, the entire stabilizer merely adds approximately one inch to the height of a camera. Thus making it very compatible with the new breed of small compact camcorders. The entire assembly possesses a neat and uniform appearance. It can remain mounted on a camcorder even while carried in a small protective camera bag. Specifically, the major elements of the preferred embodiment of this invention are:

A support arm which can be extended to rest on the users shoulder or pivoted to nestle within its housing mounted beneath a camera;

a camera mounting body small enough to fit directly beneath a camcorder and designed to house the support arm;

a camera mounting body which also includes finger grips on each side whereby the operator can use his second hand to further steady the camera;

a self-executing retentive mechanism utilizing a leaf spring and a cam which automatically secures the shoulder support arm while in the folded or extended position thereby relieving the operator of fumbling with locking devices;

an adjusting screw which facilitates raising or lowering the elevation of the shoulder support arm while in the extended position.

DETAILED DESCRIPTION OF THE PREFERRED EMBODIMENT

Figure 4:
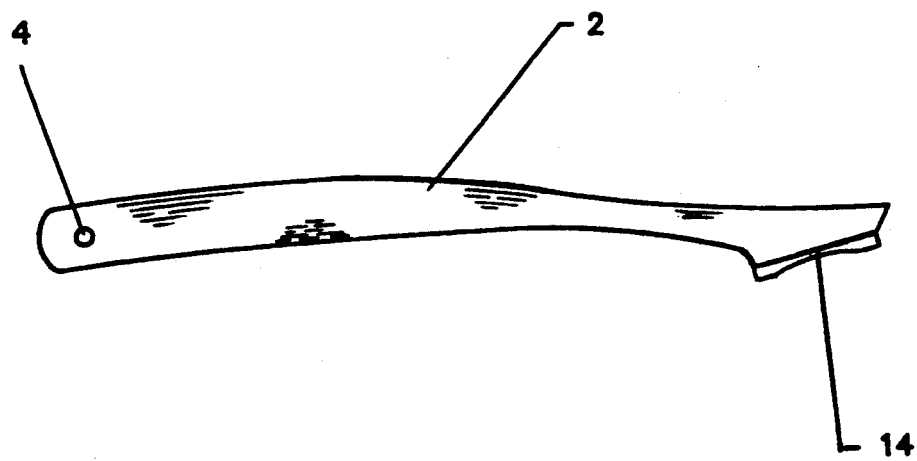
FIG. 4 shows the left side view of the shoulder support arm member of the stabilizer.
Figure 5:
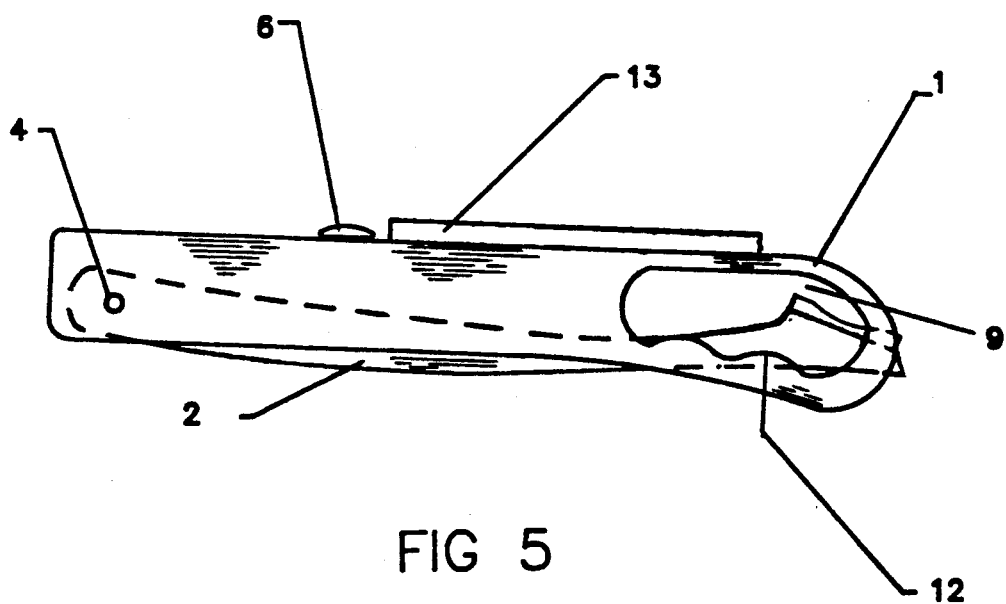
FIG. 5 shows a right side view of the shoulder stabilizer with the shoulder support arm member folded and stowed within the channel of the camera mounting body.
Figure 6:
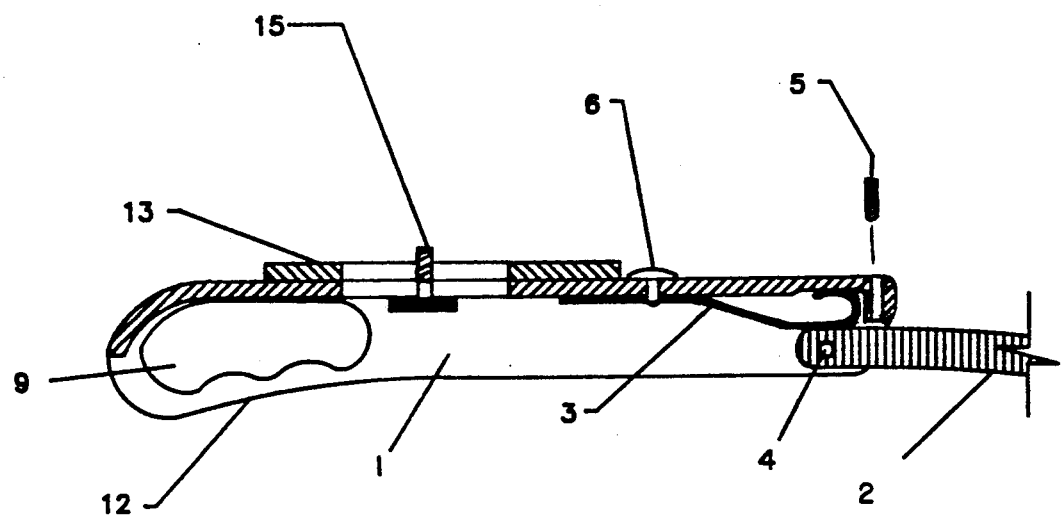
FIG. 6 shows a sectional view of the preferred embodiment of the shoulder stabilizer. It illustrates (a) the interior of the channel shaped body, (b) the leaf spring and its relationship to the rounded end on the shoulder support arm which acts as a cam, and (c) the adjustment screw which raises or lowers the elevation of the shoulder support arm. The sectional view is taken along section line 6—6 as shown in FIG. 3.

Referring to FIGS. 1 through 6, it can be seen the main features of the preferred embodiment of this invention comprise a camera mounting body 1 and a shoulder support arm 2. Other major elements, shown in the section view FIG. 6 are nestled within the under side of the channel of camera mounting body 1. These are leaf spring 3 and the rounded pivotal end of shoulder support arm 2 which functions as the leaf spring activating cam.

Figure 1:
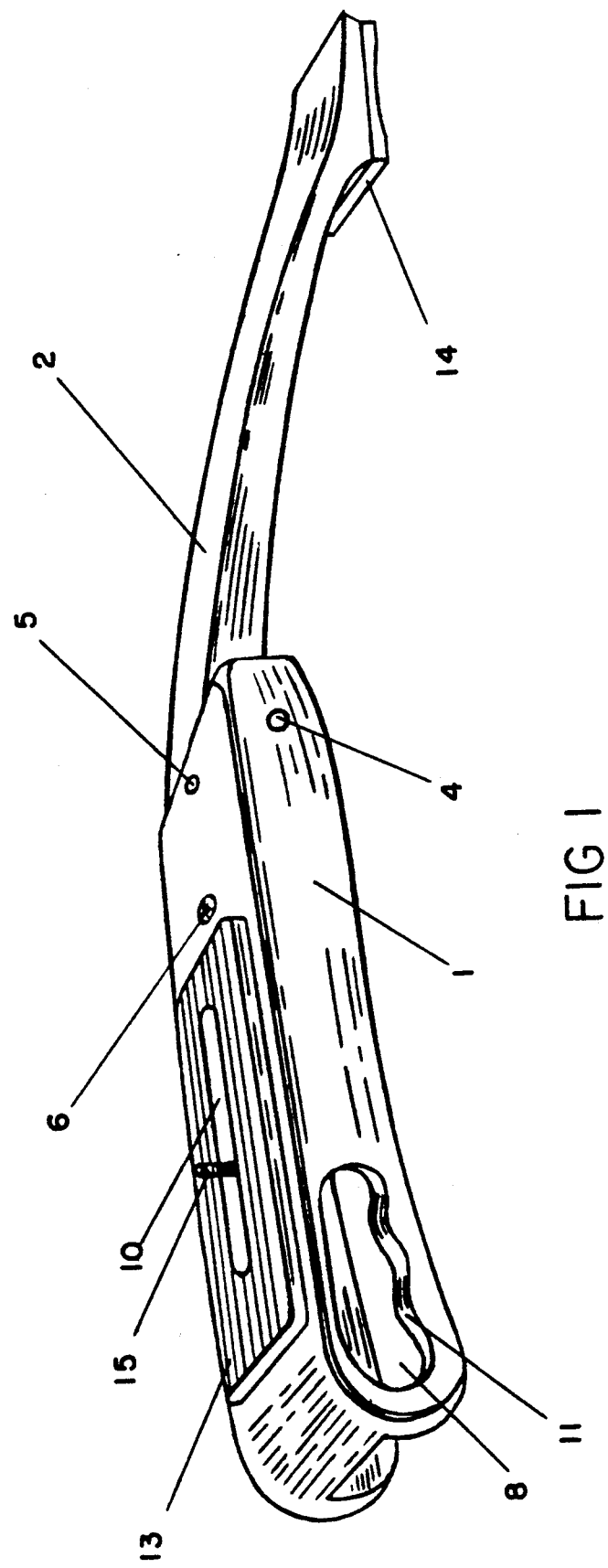
FIG. 1 shows a perspective view of the preferred embodiment of this shoulder supported camera stabilizer. The support arm is in the extended position.
Figure 2:
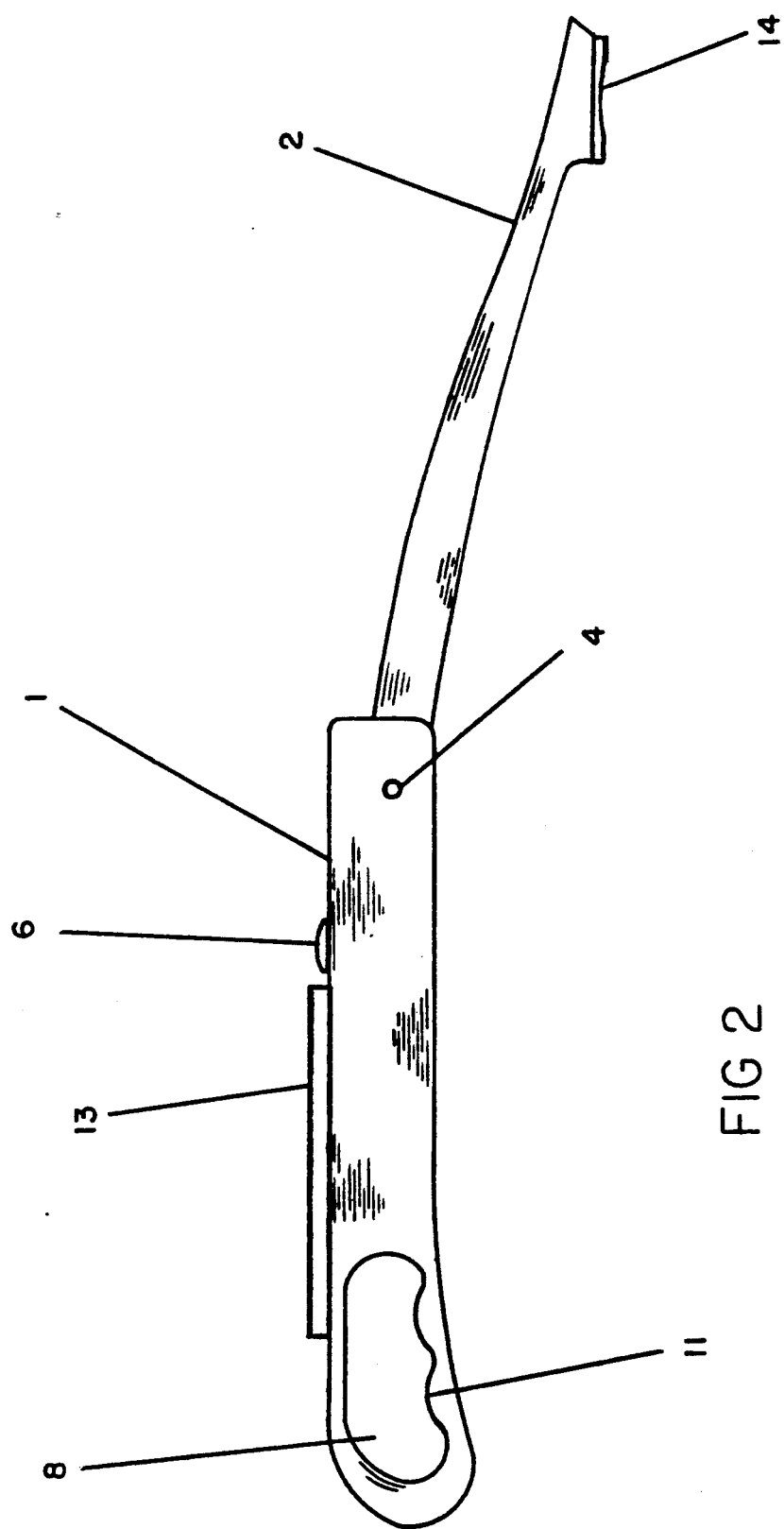
FIG. 2 shows the left side view of the same stabilizer.

Specifically, as shown in FIG. 1 this invention includes camera mounting body 1 with a channel on its underside. The purpose of this channel is to house, or stow, other elements of the invention of maximum compactness. The camera mounting body 1 is capable of being fastened to a camera by a screw 15 through a slot 10 in the top of the mounting. The camera is cushioned on mounting 1 by pad 13. Slot 10 provides for positioning the camera forwardly or readwardly on the mounting for more comfortable use by the operator.

Near the front of camera mounting body 1 and located on both sides are apertures 8 and 9 which form finger grips 11 and 12. These are shown in FIGS. 1,2,5 and 6. Finger grips 11 and 12 enable the user to further steady the camera by bracing the mounting with his second hand (the hand not used in operating the camera). One finger grip 11 or 12 is provided on each side of the camera mounting to facilitate use by a left or right-handed user. The front end of the camera mounting body 1 is curved downward in order that finger grips, 11 and 12 may also be curved downward. This downward curve results in a slight angle of the gripping surfaces, thereby providing a more comfortable grip for the user.

Figure 3:
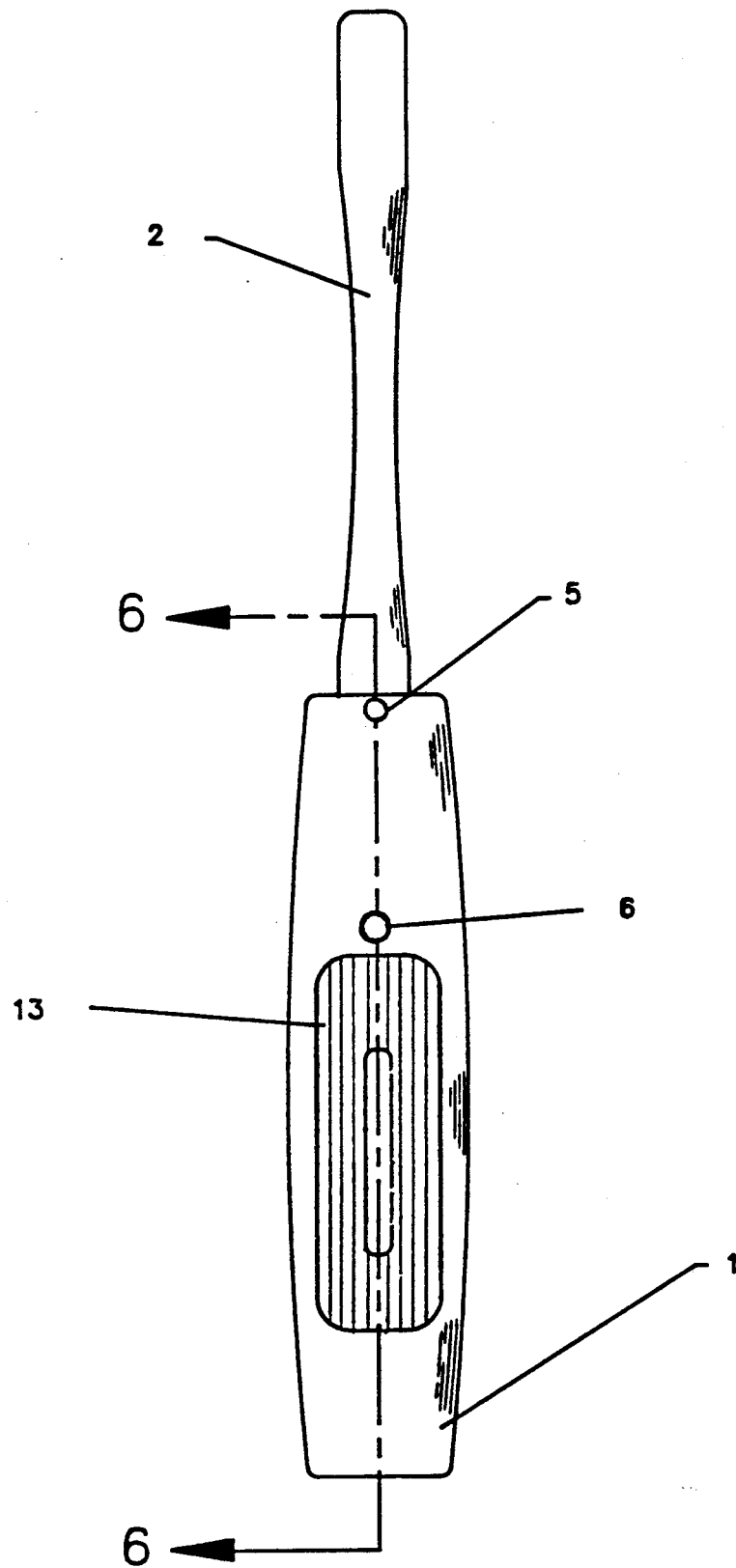
FIG. 3 shows a top view of the same stabilizer. It illustrates the plane of the sectional view in FIG. 6.

FIG. 4, shoulder arm 2 is shown. Shoulder rest pad 14 is located at one end of support arm 2. The opposite end is rounded. This rounded end functions as a spring activating cam when support arm 2 is pivoted into the channel of camera mounting body 1 or pivotally extended to rest on the users shoulder to stabilize the camera during use. Support arm 2 pivots on a rivet type shaft 4 shown in FIGS. 1, 2, 4, 5 and 6. The shoulder arm 2 is shown extended and ready for use in FIGS. 1 and 2, while in FIG. 5 it is shown folded and stowed within the channel of camera mounting body 1. FIG. 3 is the top view of the invention. It indicates the location and direction of the sectional view 6—6 shown in FIG. 6.

As can be seen in the sectional view FIG. 6, a shaped leaf spring 3 is mounted within the channel on the underside of the camera mounting body 1. The forward end of leaf spring 3 is fastened to camera mounting body 1 by use of rivet 6.

The purpose of leaf spring 3 is to hold shoulder arm 2 in position. When support arm 2 is folded into camera mounting body 1 or extended rearwardly for use, its rounded pivotal end, functioning as a cam, activates leaf spring 3. Tension of leaf spring 3 pushes against the "cam", thereby holding shoulder support arm 2 firmly and securely in either the stowed or extended position.

FIG. 5, shows aperture 9 and finger grip 12 located on the right camera mounting body 1.

FIGS. 1 and 6 shows an elevation adjustment screw 5 which is also used as a stop for shoulder support arm 2 when in the extended position. Turning screw 5 in or out adjusts the elevation of shoulder support arm 2. This feature provides more comfortable eye-to-eyepiece alignment for the user.

OPERATING THE INVENTION

To use this camera stabilizer, the operator attaches the camera to the camera mounting body 1. Then shoulder support arm 2 is pivoted to the rearward position. The support arm 2 is rested on the user's shoulder. The user positions one hand to operate the camera. The other hand is position on one of the finger grips 11 or 12 provided on the side of the camera mounting body 1. Accordingly, by using both hands to grasp the camera and the mounting, the user can apply a downward pressure on the support arm 2 where it engages the shoulder. For maximum steadiness, the user should also draw the elbows firmly toward the body and rib cage. Using this method of operation, this stabilizer will noticeably reduce the nervous, high frequency shanking of the camera and result in more satisfactory photography.

RAMIFICATIONS AND SCOPE OF THE INVENTION

The above description contains many specifics; however, these should not be construed as limiting the scope of the invention. The description merely provides an illustration of a particularly preferred embodiment of the invention. In other embodiments for example, the support arm may take on sereral different forms, such as one bent from flat bar stock or a rod. The rearward extension of the support arm may be accomplished by other means such as using a slide mechansim rather than a pivoting mechanism. If a slide mechanism were chosen, the shape of the support arm housing may be modified. A box or other shape rather than a channel may be used.

The invention as shown in the accompanying drawings was designed primarily for use with small video camcorders. According, during use, the long axis of the camera mounting body is parallel to the users line of sight. In other embodiments, the long axis of the mounting body could be made perpendicular to the users line of sight to better facilitate use with other types of cameras. The sides of the camera mounting body could be extended, or the body could be L or T shaped to provide a more suitable mounting surface. Also, it should be recognized that other sighting devices or instruments may be used with this stabilizer.

The self-executing retentive spring mechanism which firmly positions the support arm might take other forms. The spring could be mounted to the side of the channel wall, also, it may utilize a different form of spring. If a leaf spring were mounted on the wall of the channel, the activating device might simply be a dimple or ridge on the side of the support arm. In other modifications, the support arm might be pivoted on a screw, rather than a rivet.

Accordingly, the scope of the invention should be limited only by the appended claims, rather than by the examples presented here.

I claim:

1. An operator supported stabilizer for cameras comprising:
    a) a body which can be attached to a camera, said body designed to house other elements of the stabilizer, thereby providing compactness;
    b) a support means attached to said body such that said support can be retracted and stowed within said body or extended rearwardly of the camera to engage a user's shoulder;
    c) a self-executing retentive means for securely positioning said support while in the strowed or rearwardly extended position.

2. The operator supported stabilizer defined in claim 1 wherein said body member includes a channel to facilitate housing said suport member.

3. The operator supported stabilizer defined in claim 1 wherein said support member is pivotally coupled to said body member.

4. The operator supported stabilizer defined in claim 1 further including an adjusting means to raise or lower the elevation of said support when in the extended position.

5. The operator supported stabilizer defined in claim 1 further including an aperture and finger grips in each side of said body to accommodate finger gripping by the user.

6. The operator supported stabilizer defined in claim 1 wherein said self executing retentive means comprises a leaf spring fastened on the under side of said mounting body and a rounded end which functions as a cam located on one end of said support member opposite that end which engages the user's shoulder, whereby tension on said spring acting on said cam securely positions said support in the stowed or reawardly extended position.

7. An operator supported stabilizer for video cameras comprising:
    a) a base for mounting a camera, said base designed to house other elements of the stabilizer, thereby resulting in compactness;
    b) a support member attached to said base whereas said support can be retracted and stowed within said base or extended rearwardly of the camera to engage the user's shoulder;
    c) a self-executing retentive means for securely positioning said support while in the stowed or rearwardly extended position.

8. The operator supported stabilizer defined in claim 7, wherein said base includes a channel to facilitate housing said support member.

9. The operator supported stabilizer in claim 7, wherein said support member is pivotally coupled to said base member.

10. The operator supported stabilizer defined in claim 7, further including an adjusting means to raise or lower the shoulder engaged end of said support when in the extended position.

11. The operator supported stabilizer defined in claim 7 further including an opening and finger grips in each side of said base to facilitate finger gripping by the user.

12. The operator supported stabilizer defined in claim 7 wherein said self-executing retentive means includes on one end of said support member opposite that end which engages the shoulder, a rounded end which functions as a cam, and also includes a leaf spring fastened on the under side of said base, whereby tension on said spring acting on said cam securely positions said shoulder support in either the stowed or rearwardly extended position.

* * * * *